Jan. 31, 1961     J. W. DISTEL ET AL     2,969,766
FLATTENING AND COATING DEVICE FOR PHOTOGRAPHIC PRINTS
Filed March 25, 1959     3 Sheets-Sheet 1

INVENTORS
Joseph W. Distel
Karl Maierhofer
and
Maxfield Parrish, Jr.
BY
Brown and Mikulka
ATTORNEYS Jan. 31, 1961 J. W. DISTEL ET AL 2,969,766
FLATTENING AND COATING DEVICE FOR PHOTOGRAPHIC PRINTS
Filed March 25, 1959 3 Sheets-Sheet 2

INVENTORS
Joseph H. Distel
Karl Maierhofer
BY Maxfield Parrish, Jr.

Crown and Mikulka
ATTORNEYS

Jan. 31, 1961 J. W. DISTEL ET AL 2,969,766
FLATTENING AND COATING DEVICE FOR PHOTOGRAPHIC PRINTS
Filed March 25, 1959 3 Sheets-Sheet 3

INVENTORS
Joseph W. Distel
Karl Maiershofer
BY and Maxfield Parrish, Jr.

ATTORNEYS 2,969,766
Patented Jan. 31, 1961

2,969,766

FLATTENING AND COATING DEVICE FOR PHOTOGRAPHIC PRINTS

Joseph W. Distel, Boston, and Maxfield Parrish, Jr., Lexington, Mass., and Karl Maiershofer, Norridge, Ill., assignors to Polaroid Corporation, Cambridge, Mass., a corporation of Delaware Filed Mar. 25, 1959, Ser. No. 801,925

13 Claims. (Cl. 118—503)

The present invention relates to a device for flattening a photographic print which is in a curled condition and for supporting the flattened print and holding it stationary so that a liquid coating composition can readily be applied to its surface.

In a self-processing camera of a type producing a finished print within approximately one minute, a processing fluid is spread between a pair of internal layers of a film assembly, after which the layers are peeled apart and a film or sheet bearing a positive image, i.e., a positive reflection print, is provided. At this stage, it has been found desirable to apply a protective or stabilizing coating to its surface and an applicator having an absorbent surface impregnated with a proper liquid coating composition is provided, commercially, for the purpose.

For one or more reasons, i.e., due to the fact that the material for carrying the image has been supplied in roll form and has acquired a curved contour, or to permeation of the solvent of the processing fluid into the material, or for some other reason, the print may tend to coil upon itself longitudinally. It is, of course, desirable to eliminate this condition so that the print is flat for facilitating the application of the aforesaid protective coating to its surface and for ultimate viewing.

It is therefore an object of the invention to provide a compact and convenient device both for eliminating an unwanted deformation in a photographic print produced in a self-processing camera and for holding the print in a flattened and supported condition to enable the application of a protective coating to its surface.

Other objects of the invention are to provide a device of the character described which is adapted to be attached to, or, alternatively, at least in part to form, the back of a self-processing camera; to provide a device which enables the application of the protective coating rapidly and evenly; to provide a device, as described, wherein a print-supporting surface is protected against soil and damage when not in use; to provide a device of the character described which permits the print coating operation to be performed by one hand, only.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
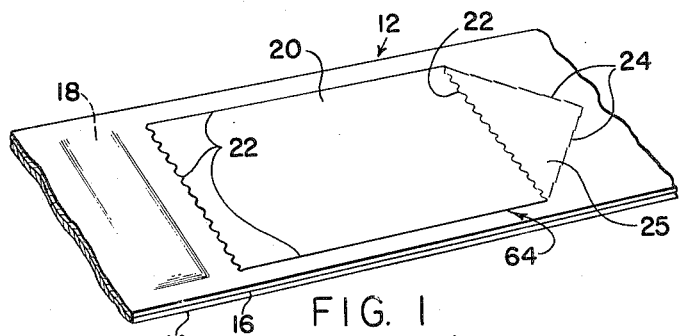
Figure 1 is a diagrammatic, perspective view of photographic material used with the device of the invention.

Referring to Fig. 1, there is shown a fragmentary portion of an assembly 12 of photographic sheet materials suitable for use in a self-processing camera of the type previously mentioned as they would appear after the exposure of a photosensitive element thereof and after the materials have been passed between compressive means of the camera. The assembly 12 consists of a film layer 14, having an inner photosensitive surface, and a layer 16 adapted to receive or otherwise to contribute in providing a positive image by a diffusion transfer operation. An exhausted container, from which a processing fluid has been discharged between layers 14 and 16 is positioned between the layers at the location 18. The portion 20 of the image-receiving layer 16, bounded by semi-perforations 22 and 22a, is that within which the fluid is spread to form the image. Semi-perforations 22 and 24 permit the area of layer 16 contained therewithin and comprising the positive image to be lifted of excised from surrounding portions and to be peeled from the underlying film emulsion in one section, the semi-perforations 22a being intentionally made less disposed to separate than the other semi-perforations. The portion 25 is that which is first lifted from the underlying negative and also serves as a tab for manipulating the print in operations to be described below.

Figure 2:
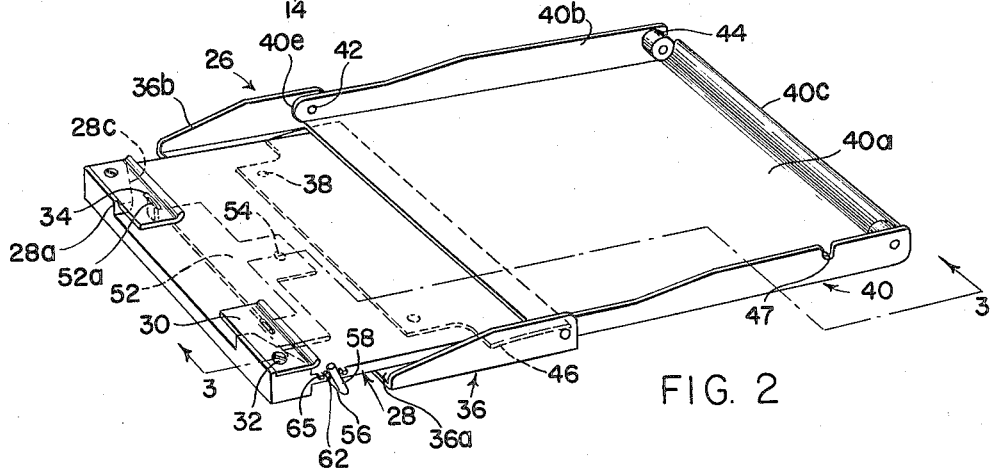
Fig. 2 is a diagrammatic, perspective view of the print flattening and coating device of the invention.
Figure 3:
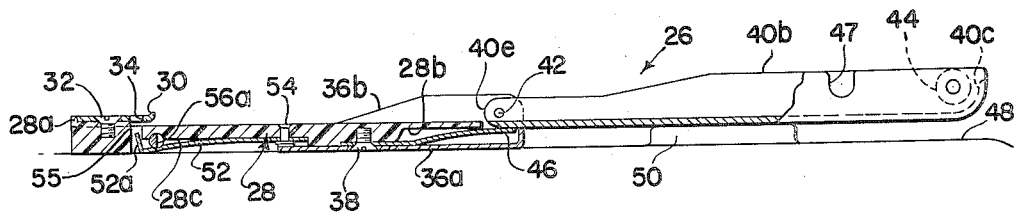
Fig. 3 is a side elevation, partly in cross-section, of the device of the invention.

The print flattening and coating device 26 is shown in detail in Figs. 2 and 3. The main bed or platform 28 is formed of a suitable plastic or a metal, preferably in one piece in the form of a moulding. Portions 28a, at the left-hand extremity, are slightly elevated with respect to the principal plane of the platform. A pair of overhanging print-retaining plate members 30 are attached thereto by screws 32 which threadedly engage the platform. Each plate member 30 has a slot 34 formed therein for a purpose to be described below.

A metallic yoke member 36 comprises a principal planar portion 36a which extends transversely beneath platform 28 and is fastened thereto, by screws 38 threadedly engaging the platform, and a pair of shoulders 36b at either side which serve in part as guides for positioning the print and in part as supports for pivotally mounting the cover 40.

Cover 40 is rotatably mounted on shoulders 36b by pivots 42. The cover comprises a principal planar portion 40a which, when at the open position shown, forms an extension of the supporting platform 28 for holding the print, and side members 40b which provide guide and positioning means for the print. A pair of guide rollers 44 is rotatably mounted adjacent the outer extremity of the cover. These rollers, together with the rounded edge 40c of the cover, constitute means for guiding and flattening a photographic print which possesses an inherent deformation such as a longitudinal curvature, due to causes above described. The lateral distance between shoulders 36b and between shoulders 40b exceeds, in width, a print to be treated and each of the platforms 28 and 40a, alone, is shorter than the print in length. However, both platforms, together, provide a supporting surface which exceeds the length of the print.

Figure 4:
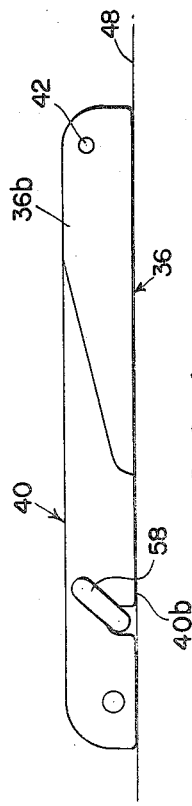
Fig. 4 is a diagrammatic side view of the device of the invention with the cover closed.

The opposite extremity of the cover and, more particularly, the ends 40e of side members 40b, are rounded. A flat spring 46 is mounted between the plate portion 36a and platform 28 by the screws 38 which preferably pass freely through apertures in the spring. A cut-out area 28b of the platform 28 provides a space between the platform and plate portion 36a permitting free movement of the spring, as particularly shown in Fig. 3. When the cover is fully open, spring 46 bears against the flat surface 40a and holds the cover at open position. When the cover is closed, as shown in Fig. 4, spring 46 bears against the flat edges of side members 40b and holds the cover closed. The cover portions 40e and portions at either side thereof, together with spring 46, constitute a camming means for holding the cover releasably, yet firmly, either at open or closed position. As shown in Figs. 3 through 6, the device 26 is mounted on the back of the camera 48 as, for example, it is cemented thereon or, alternatively, it may be releasably screwed or clipped thereto by means, not shown. The cover is supported, at open position by the latching release button 50, provided for opening the camera back.

Again referring to the left-hand portions of the device, as particularly shown in Figs. 2 and 3, a flat specially-shaped element 52 formed of a springy metal and having a pair of upwardly extending projections or fingers 52a is fastened to the under surface of platform 28 by means such as rivet 54, a cut-out portion 28c of the platform and a pair of apertures 55 being provided to permit free up and down movement of a principal portion of the element 52, including the projections. The normal biased position of the movable part of element 52 is snug against the under surface of platform 28. At this position the projections 52a extend within apertures 55 and the slots 34 of plate members 30, the correct lateral location of the projections being basically established by contact of element 52 with shoulder 28d. The projections 52a and plates 30, together, provide a holding means for the film assembly which will be described in greater detail below.

Means for actuating the flexible element 52 toward and away from platform 28 and, accordingly, the projections 52a into and out of slots 34, comprises a rod element 56 having a handle 58, the rod element being mounted for rotation in bearing means 60 extending transversely across and within the under surface of platform 28, between the element 52 and said under surface. The functional portion of rod 56 consists of a half-round portion 56a which, in effect, constitutes a cam lobe adapted to be brought into and out of contact with the spring-like element 52. When handle 58 is turned to its extreme counterclockwise position, as shown in Fig. 2, a condition also assumed to exist in Fig. 3, it forces element 52 away from platform 28 thus causing projections 52a to be withdrawn from slots 34. When handle 58 is turned to its maximum clockwise position, the opposite operation occurs and element 52, being biased toward platform 28, carries its projections 52a toward the slots. Limit stop means, such as a pin 62 in rod element 56 and a pair of shoulders 65 formed in platform 28, serve to establish the rotational limits of the rod element in both directions. In an alternative construction, it will be understood that a slight modification would permit the camming action to impel the projections 52a toward rather than away from slots 34, in which instance element 52 would be biased in a direction away from platform 28.

Figure 5:
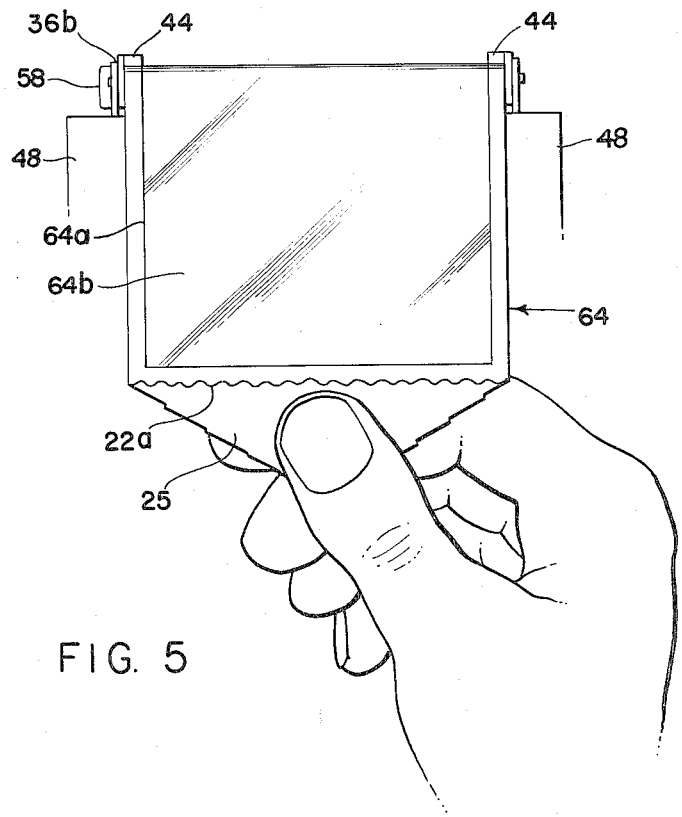
Fig. 5 is a diagrammatic view illustrating the operation of flattening a photographic print to eliminate its previously curled condition.

Referring now to the operations performed with the print flattening and coating device 26, its function in flattening the print is illustrated in Fig. 5 wherein the device is viewed from the right-hand or cover end. It is to be assumed that a print assembly 64 has been peeled from the overall assembly of materials 12 shown in Fig. 1, along the semi-perforations 22 and 24, and has been placed on the supporting surface of the device composed of platform areas 28 and 40a, with the image-bearing surface facing upwardly. It is also to be assumed that the print curls inwardly toward the image-bearing surface and that it is desired to remove this deformation. The leading lateral edges of tab 25 are first inserted under rollers 44 so that the tab extends slightly beyond rounded edge 40c. Assuming the camera, upon which device 26 is mounted, to be resting on a suitable surface and, preferably, held with the free hand, the print is pulled manually in a downward and slightly outward direction over the edge 40c. A desirable frictional and slightly retarding force is provided by contact of marginal areas of the print with the rollers 44 and through contact of its under side with curved edge 40c. The print is drawn upon until it has been completely removed from device 26. This procedure serves to eradicate the curl in the print. It will be noted that rollers 44 bear only against longitudinal marginal portions 64a so that the image area 64b is maintained free from contact with any part of the device and there is no danger of its becoming scratched.

Figure 6:
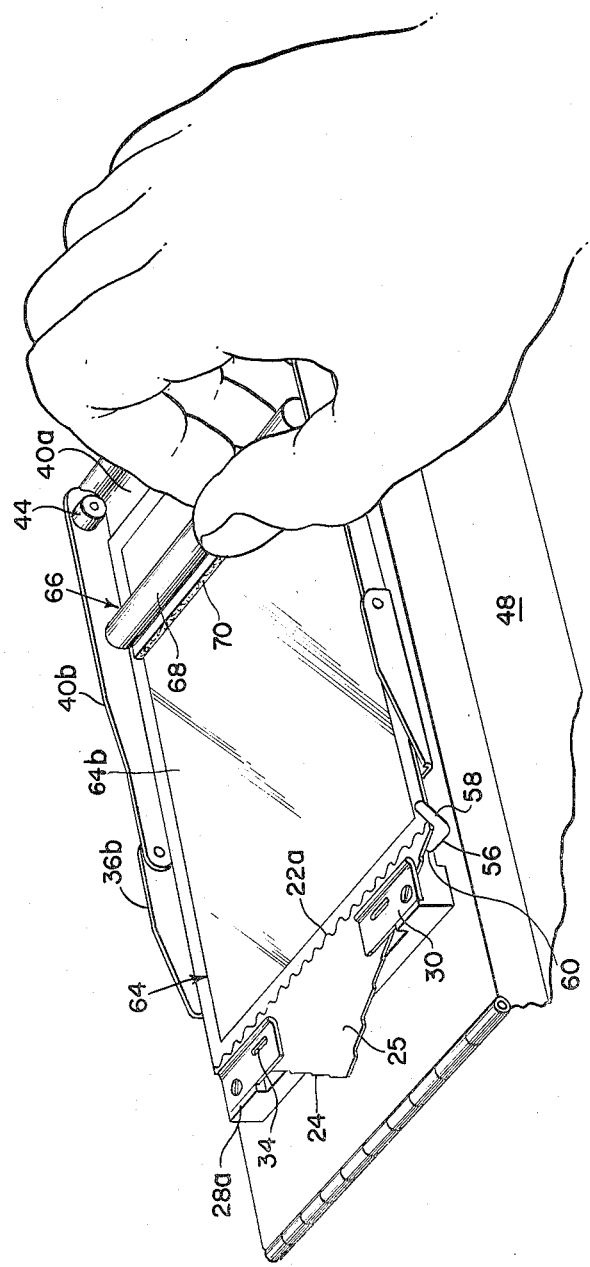
Fig. 6 is a diagrammatic, perspective view illustrating the use of the device of the invention in applying a protective coating to the flattened photographic print.

After the curl has been removed from the print, the image-bearing surface is ready to be coated. The surface coating operation is illustrated in Fig. 6. With handle 58 at its maximum counterclockwise position, the flattened print is again placed on the platform components 28 and 40, with the image-carrying surface facing upward. The print, however, is positioned in a direction which is the reverse of that previously described, so that the tab 25 is inserted between plate members 30 and platform 28, the spacing therebetween being slightly in excess of the thickness of the print and the leading edges 24 of the tab abutting the diagonal faces 28e of elevated portions 28a to establish the proper location of the print. Handle 58 is then turned to its maximum clockwise limit thus permitting the projections 52a to bear against portions of the under surface of tab 25 which are aligned with the slots 34, the projections tending to force the aligned tab portions slightly within the slots 34 and serving to hold the print fixed against longitudinal movement.

With the print thus mounted and held on the platform components of the device 26, it is in readiness for an application of the protective and stabilizing liquid coating. The coating is applied from a suitable applicator 66 such, for example, as that shown and comprising a flexible handle or holder 68 and a soft absorbent material 70 contained within the holder and projecting evenly below the latter so as to provide a suitable surface for contacting the prints. The absorbent material is impregnated with a print stabilizing and protective liquid composition adapted, when solidified, to form a surface layer on the print. By slightly squeezing the holder, the processing liquid is forced into the print-contacting portion of the absorbent material. A suitable coating composition for the purpose is disclosed in U.S. Patent No. 2,692,675, issued to Edwin H. Land et al. An applicator device of the general type contemplated is disclosed in U.S. Patent No. 2,768,403, issued to Charles A. Govatsos. The liquid coating composition is applied in a straight stroke commencing slightly to the left of the semi-perforations 22a and proceeding to the right-hand margin of the print. Several such complete strokes are recommended for insuring complete coverage of the print.

Location of the print flattening and coating device in close association with the camera, i.e., on the camera back, is advantageous for several reasons. In a self-processing camera of the type previously mentioned, namely, one in which the photographic assembly of Fig. 1 is adapted to be employed, the processing operation, after spreading of the processing fluid, comprises development of the negative, the diffusion transfer of imageforming components, and formation of the positive image, and usually requires but one minute or less. Thereafter, it is advisable to strip the print from the negative, as previously described, and to apply the protective and stabilizing coating promptly. Assuming the device 26 to be mounted on the camera back and to be closed as shown in Fig. 4, the camera back is released by means of latching button 50, swung to open position, the print is stripped from the negative, the camera back is closed, the device 26 is opened, and the flattening and coating operations, described with respect to Figs. 5 and 6, are immediately performed. Furthermore, and as previously mentioned, the camera back provides a suitable, generally flat surface for mounting the device 26, where, for example in field use, such a surface may not readily be available, and the weight of the camera contributes to the stability of the mounting.

Although the projections 52a are shown as somewhat elongated, they may be differently formed. Assuming, for example, the tab 25 to have two laterally spaced apertures formed therein and separated by a distance approximately equal to the spacing between the slots 34, modified projections in the shape of pins would be adapted to enter the apertures for positively holding the print against longitudinal movement during the coating operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A device for eradicating unwanted deformation of a photographic print and for facilitating the coating of its surface with a protective stabilizing fluid, said device comprising means providing a first fixed platform serving in part to support said print, said platform being of a lesser length than said print, a yoke member rigidly attached to said fixed platform, means pivotally attached to said yoke member providing a second platform for completing the support of said print and being of a relatively greater width but a lesser length than said print, said second platform, when pivoted to closed position, constituting a cover for said first platform and, when at open position, constituting, in effect, an extension of said first platform whereby a substantially continuous supporting surface of a length exceeding that of said print is provided, rounded surface means contiguous the longitudinal extreme of said second platform remote from said first platform for providing a given frictional contact with said print to remove said deformation during passage of said print across said surface, and means mounted on said first platform for holding said print fixed against longitudinal movement when said print is mounted on said first and second platforms in position for an application of said protective stabilizing fluid to an exposed image-bearing surface thereof.

2. A device as defined in claim 1, which is adapted to be attached to a movable back of a camera while permitting freedom of movement of said camera back.

3. A device as defined in claim 1, wherein said second platform comprises a pair of longitudinal side members attached by pivot means to said yoke member at an end proximate to said first platform.

4. A device as defined in claim 3, wherein a pair of rotatable guide rollers is mounted on said side members so as to face inwardly adjacent said rounded surface means for bearing against the longitudinal margins of said print and guiding said print against said surface means.

5. A device as defined in claim 3, wherein the ends of said side members adjacent said pivot means are rounded and, in conjunction with contiguous flat top and bottom surfaces, constitute surfaces of relatively differing radii serving as cam means.

6. A device as defined in claim 5, wherein there is included flat metallic spring means having one extremity rigidly fastened between said first platform and said yoke member and the other extremity free for movement, and wherein said free extremity bears against said cam means for releasably holding said second platform at open and closed positions.

7. A device as defined in claim 1, wherein said holding means constitutes a generally flat springy metallic element attached to the under side of said first platform having a pair of upwardly projecting fingers extending through a pair of apertures formed in said first platform, and a pair of plate members attached to said platform so as to overlie said fingers and to be spaced from the print-bearing surface of said platform by an amount slightly exceeding the thickness of said print.

8. A device as defined in claim 7, wherein said plate members have a pair of apertures formed therein in alignment with said projecting fingers.

9. A device as defined in claim 7, wherein portions of said first platform supporting said plate members extend diagonally with respect to the edges of said platform and are adapted to accept the angularly formed leading edges of a tab of said print.

10. A device as defined in claim 7, wherein means are provided for manually actuating said flat springy element toward and away from the under side of said platform thereby to move said projecting fingers toward and away from said overlying plate members.

11. A device as defined in claim 10, wherein said means for actuating said springy element comprises a rod-like element rotatably mounted transversely of the under side of said platform and including a cam portion bearing against said springy element, and a handle for turning said rod-like element.

12. A device as defined in claim 11, wherein is provided limit stop means for establishing the clockwise and counterclockwise limits of rotation of said rod-like element.

13. A device adapted to be mounted on the pivotally movable back of a self-processing camera for eradicating unwanted deformation of a photographic print and for facilitating the coating of its surface with a protective stabilizing fluid, said device comprising means providing a first fixed platform serving in part to support said print, said platform being of a relatively greater width but a lesser length than said print, a yoke member rigidly attached to said fixed platform, means providing a second platform for completing the support of said print, also of a relatively greater width but a lesser length than said print, and including a pair of side members pivotally attached to said yoke member, said second platform, when pivoted to closed position, constituting a cover for said first platform and, when at open position, constituting, in effect, an extension of said first platform whereby a substantially continuous supporting surface of a length exceeding that of said print is provided, rounded surface means contiguous the longitudinal extreme of said second platform remote from said first platform for providing a given frictional contact with said print to remove said deformation during passage of said print across said surface, a pair of guide rollers cooperating with said rounded surface to guide said print relative thereto, and means mounted on said first platform for holding said print fixed against longitudinal movement when said print is mounted on said first and second platforms in position for an application of said protective stabilizing fluid to an exposed image-bearing surface thereof.

No references cited.